(12) United States Patent
Smith

(10) Patent No.: US 6,382,336 B1
(45) Date of Patent: *May 7, 2002

(54) GUIDE WHEEL INTEGRATED WITH GROUND RUBBING BRAKE CONTROLS FLUID LEVITATED LOADS

(76) Inventor: Jason L. Smith, 2053 Grant Rd. #109, Los Altos, CA (US) 94024

( * ) Notice: Subject to any disclaimer, the term of this patent is extended or adjusted under 35 U.S.C. 154(b) by 0 days.

This patent is subject to a terminal disclaimer.

(21) Appl. No.: 09/528,652

(22) Filed: Mar. 20, 2000

(51) Int. Cl.[7] .................................................. B60V 1/14
(52) U.S. Cl. ........................................ 180/119; 180/125
(58) Field of Search ................................. 180/119, 124, 180/125, 128, 116

(56) References Cited

U.S. PATENT DOCUMENTS

| | | | | |
|---|---|---|---|---|
| 3,390,736 A | * | 7/1968 | Thomas ...................... 180/119 |
| 3,586,118 A | | 6/1971 | Bertin ......................... 180/119 |
| 3,592,285 A | | 7/1971 | Noble ......................... 180/124 |
| 3,610,364 A | * | 10/1971 | Snoeyenbos ................ 180/124 |
| 3,752,331 A | | 8/1973 | Colburn ...................... 214/1 A |
| 3,796,279 A | * | 3/1974 | Burdick et al. ............. 180/124 |
| 3,807,035 A | * | 4/1974 | Moorman et al. .......... 180/125 |
| 3,825,093 A | * | 7/1974 | Burdick et al. ............. 180/119 |
| 3,825,094 A | * | 7/1974 | Burduck ..................... 180/125 |
| 3,829,116 A | | 8/1974 | Burdick ................... 280/43.23 |
| 3,831,708 A | | 8/1974 | Terry .......................... 180/119 |
| 3,891,048 A | * | 6/1975 | Burdick ...................... 180/119 |
| 4,427,086 A | | 1/1984 | Coiselet ...................... 180/119 |

* cited by examiner

Primary Examiner—Robert J. Oberleitner
Assistant Examiner—Mariano Sy
(74) Attorney, Agent, or Firm—Paul Hentzel

(57) ABSTRACT

An invention (58) for attachment to a near frictionless fluid levitated transporter includes a guide wheel (18) integrated with a ground rubbing brake (20). Invention (58) both guides and stops transporter movement.

4 Claims, 3 Drawing Sheets

GUIDE WHEEL INTEGRATED WITH GROUND RUBBING BRAKE CONTROLS FLUID LEVITATED LOADS

BACKGROUND-FIELD OF INVENTION

This invention applies to the industry concerned with guidance and propulsion of heavy loads from place to place about a floor. This is a fluid bearing industry where loads levitate upon a near frictionless pressurized fluid plenum during transport. More particularly, this invention relates to the integration of a guide wheel function with the ground rubbing brake function within one assembly. Prior inventions include guide wheels that have connected a braking function that does not include ground contact. Examples of prior art include a wheel with disc brakes and a wheel with shoe brakes. A specific example of a similar guide wheel with a non ground contacting braking function used in the fluid levitated load industry includes that disclosed in U.S. Pat. No. 4,427,086 by Coiselet Jan. 24, 1984.

The wheel with integrated brake assembly of my invention includes a braking pad that does rub on the ground to slow the levitated load.

BACKGROUND-DESCRIPTION OF PRIOR ART

Since loads levitate upon a nearly frictionless fluid cushion, it takes surprisingly low forces to move load. On level floors, relatively smaller loads move by a human operator pushing or pulling on load. Heavier loads often move with a motorized transporter. A problem is not so much in getting load to move, but to stop its inertia safely once it gets moving, especially down a slight grade. Prior art inventions have solved the stopping problem by attaching a ground rubbing brake assembly to the bottom of the load. Representative prior art ground rubbing brake invention includes that disclosed in U.S. Pat. No. 3,752,331 by Colburn Aug. 14, 1973.

Sometimes it is most difficult to guide load in the direction of motion desired by the operator. Even the slightest uneven floor condition and cause the load to drift laterally. Prior art inventions have solved the guiding problem by attaching a guide wheel assembly under the load. Both the brake assembly and the guide wheel assembly are expensive. Both assemblies take significant effort to attach to load and to plumb to the pressurized fluid supply. Both assemblies together are difficult to attach to load. Usually there is minimal available space under load that is unoccupied either by the fluid bearing devices or by some other load structure feature. It is often difficult enough to find the space to attach either a brake assembly or a guide wheel assembly, without having to find space to attach both assemblies.

Some inventions in this industry disclose a guide wheel that is brakeable with conventional type structures such as disc brake or shoe brake. The fluid bearing industry rarely uses these structures. One reason for their limited use is that fluid bearings levitating the load are relatively thin. The bearing's thickness is approximately two and one half inches. This same thickness usually dictates the distance from the floor to the bottom of load. The wheel with conventional brake shoe or disc would be most difficult and expensive to manufacture with a two and one half inch overall thickness. The solution is not practical to place the wheel outbound of the load. The load area footprint is usually quite large, and adding inches would make transport around doorways and aisles unduly difficult. An example of an outbound wheel disclosed invention is U.S. Pat. No. 3,586,118 by Bertin Jun. 22, 1971. Finally, the wheel with disc brake to be effective has be quite robust in design. The wheel assembly is very thick and made of heavy components. This is necessary to absorb the energies involved in stopping the inertia of say a typical moving 15,000 pound load. Such wheel and brake combinations would be very expensive and large and would appear similar to those used on an automobile. Typical brakes used in the fluid caster industry use a pressure actuated ground rubbing pad for purposes of thin profile to fit beneath load and for low manufacturing cost.

My invention has the object of integrating the rubbing brake function with the guide wheel function within one assembly while maintaining the thinness necessary to fit beneath the load. Additional unexpected advantages resulted: The cost of the integrated assembly is much less than the cost of the separate assemblies. The attachment footprint of the integrated assembly is much less than the footprint of the separate assemblies. Plumbing the integrated assembly to a pressurized fluid supply is easier. Attachment of the integrated assembly to the load is easier. The weight of the integrated assembly is less.

SUMMARY OF THE INVENTION

My invention integrates a ground rubbing brake assembly with a guide wheel assembly. The combined assembly results in a unique device that both stops a moving load levitated with fluid cushions and guides the load in a direction desired by the operator. The integrated brake and wheel assembly retains the thinness necessary to fit beneath load.

Many unexpected advantages result from the combination invention. My invention is about half size of the prior art brake assembly, plus guide wheel assembly. My invention is about half the weight of the prior art brake assembly, plus guide wheel assembly. My invention has almost half the parts of the prior art brake assembly, plus guide wheel assembly. My invention is much lower in cost than the prior art brake assembly, plus guide wheel assembly. My invention requires one less hose to interconnect to the pressure supply. For about the same price of either a brake assembly alone or a guide wheel assembly alone, a user can purchase my invention with both functions. Setup of my invention is easier as it has one less hose to connect. My invention requires about half the size footprint area under the load. My invention requires about half the holes and bolt connections of the brake assembly, plus guide wheel assembly.

By way of example, my invention is illustrated herein by the accompanying drawing, wherein:

DRAWING FIGURES

DESCRIPTION OF THE PREFERRED EMBODIMENTS

1. The Invention in General

Figure 1:
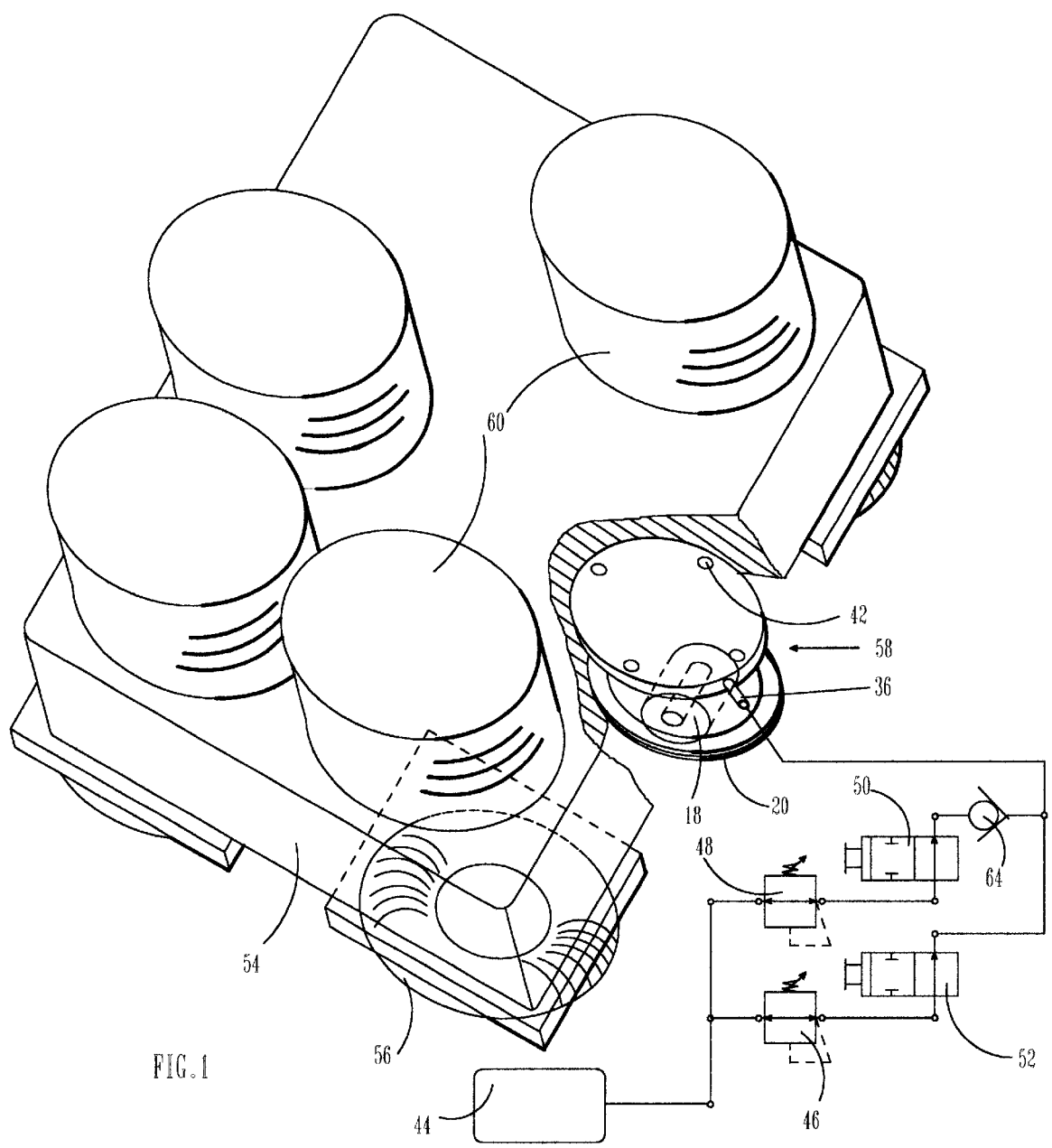
FIG. 1 is perspective view of a guide wheel integrated with ground rubbing brake shown interconnected a load levitated upon fluid casters including symbolically represented fluid controls.

My invention 'guide wheel integrated with ground rubbing brake' is shown in the view of FIG. 1 and is referred to as numeral 58. Invention 58 is shown attached to a heavy load 60 that is to be moved upon a load base 54 structure. Load base 54 levitates off a floor on fluid plenums created under floatation caster 56 devices. Compressed fluid pressurizes the plenum areas of casters 56, as is well known in this art. My invention 58 can bolt to the bottom of load base 54 via bolts extending through mounting holes 42.

The view of FIG. 1 shows at the underside of invention 58 a brake 20 and a wheel 18. Invention 58 has affixed a tube 36 that conveys pressurized fluid during actuation of either the brake function or the guide wheel function.

2. Pressurized Modes of Operation

Invention 58 has three pressurized modes of operation. Operator uses a depressurized mode when they desire to use neither the brake nor the guide wheel functions. This mode is useful when load base 54 rests without levitation or is being steered to a new direction. Operator chooses the two remaining pressurized modes as they manipulate a wheel valve 50 or a brake valve 52. Details of these modes are presented next.

3. Fluid Controls

Fluid controls of FIG. 1 are not part of invention 58. However, a description of their functioning could help in understanding invention 58 operation. A facility pressurized fluid supply 44 plumbs to a wheel regulator 48 and to a brake regulator 46. Regulator 48 adjusts to a pressure corresponding to downward force desirable on wheel 18. Regulator 46 adjusts to a pressure corresponding to desirable downward force on brake 20. Practical operation dictates that wheel regulator 48 pressure always be set less than the pressure of brake regulator 46 as will become apparent later. The output fluid pressures from wheel regulator 48 and from brake regulator 46 plumb to wheel valve 50 and brake valve 52 respectively. A check valve 64 plumbs to exit port of valve 50. Check valve 64 prevents higher brake regulator 46 pressure from ever bleeding off through the self relieving feature of regulator 48. The fluid exiting valves 64 and 52 plumb together and connect with a flexible hose to tube 36. When wheel valve 50 opens, a low pressure preset by regulator 48 conveys to invention 58, and wheel 18 forces against the floor guiding load base 54. When brake valve 52 opens, a high pressure preset by regulator 46 conveys to invention 58, and brake 20 forces to the floor stopping load base 54.

4. Invention Construction Detail

Figure 2:
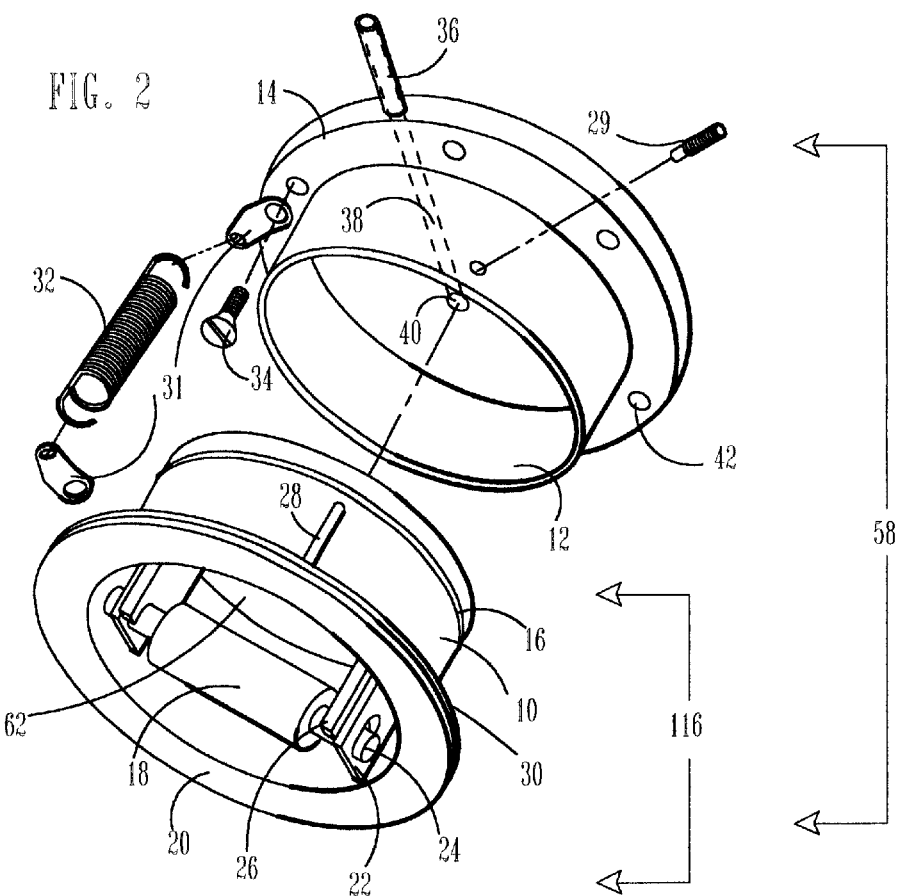
FIG. 2 is a perspective exploded view of the preferred cylinder and piston actuated embodiment of guide integrated with ground rubbing brake showing construction details.

The view of FIG. 2 shows detail about invention 58 operation. A hollow piston 10 slides axially within a cylinder 12. A seal 16 such as an o-ring affixed in a gland at the end of piston 10 contains pressurized fluid within cylinder 12 cavity. Multiple dog point set screws 29 thread through one end of cylinder 12, and slide within corresponding piston 10 wall slots 28 extending only partially through piston 10 wall. Multiple slot 28 and screw 29 combinations around the periphery prevents piston 10 from rotating, as is important in keeping drive wheel 18 always point in in one direction. Additionally, slot 28 and screw 29 combinations limit piston 10 travel so seal 16 never contacts set screws 29. A disc shaped flange 14 attaches without leakage to cylinder 12 defining a contained cavity for pressurizing fluid. Flange 14 includes perforating mounting holes 42 for bolting attachment to load base 54 of FIG. 1.

Flange 14 includes a radial fluid passage 38 within its thickness extending from the periphery of flange 14 to the center point. At this center point, a corresponding aperture 40 conveys one end of passage 38 with cylinder 12 pressurized cavity. The outer end of passage 38 has attached without leakage tube 36. Pressurized fluid front either valve 64 or 52, shown in FIG. 1 view, plumb to tube 36, through passage 38, though aperture 40, and into cylinder 12 cavity forcing against piston 10 surface. One end of piston 10 joins without leakage to a flat plate 62. Plate 62 seals piston 10, and serves as a mounting base for welding brackets 22. Brackets 22 have slots near one end to slideable accept a shaft 24. Shaft 24 is able to move in the same direction as piston 10 travel within the slots of brackets 22. Shaft 24 serves as the axle for guide wheel 18. Wheel 18 is free to revolve on shaft 24. Wheel 18 includes a center bore with appropriate annular clearance for rotation. Wheel 18 can be made from a medium hardness polyurethane material. Polyurethane assures judicious combination of floor traction, appropriate stiffness to stand downward forces, abrasion durability, with zero to limited need for lubrication at its shaft 24 interface. Under shaft 24, and adjacent to brackets 22 nest preloaded compressive springs 26 of the flexible rubber pad type. Springs 26 keep a nearly constant force applied to shaft 24. Springs 26 normally force shaft 24 to the limit of slot travel within brackets 22. Spring 26 force magnitude is that necessary to accommodate traction of wheel 18 against the floor, and is in the order of one or two hundred pounds. Springs 26 are made from a medium hardness latex rubber thus assuring appropriate compliance and strength without age setting. An annular disc shaped flange 30 attaches with welding to the other end of piston 10. Attached to flange 30 is similar shaped brake 20. Brake 20 is made from medium to hard polyurethane material so as to possess appropriate friction properties and durability. Brake 20 rigidly attaches to flange 30 with bolts. The surface of brake 20 offsets from cylindrical wheel 18 outer most surface that is to touch the floor. In this way, wheel 18 can guide load base 54 while brake 20 is off the floor. However, if piston 10 applies enough force, floor reaction force against wheel 18 will push shaft 24 against springs 26 and along bracket 22 slots retracting wheel 18 within piston 10. When wheel 18 retracts, brake 20 will push onto the floor and stop load base 54. When there is no pressurization, the subassembly 116 including piston 10 retracts within cylinder 12. Several, one only shown, extension springs 32 perform the retractive force. Springs 32 are secure to flanges 14 and 30 using anchors 31. Each anchor 31 joins to flanges 14 and 30 with bolts 34. In this manner, guide wheel 18 will not touch the floor until cylinder 12 cavity pressurizes.

Referring to FIG. 2, preferred materials for cylinder 12, piston 10, flanges 14 and 30, brackets 22, plate 62, and tube 36 are strong rigid materials such as metal, plastic, composite fiber, and the like. Shaft 24 is made from stainless steel pre-ground rod stock. Standard welding, casting, brazing, silver soldering, adhesives, and bolts can join permanently attached parts.

5. Alternate Embodiment with Air Bag Actuator

Figure 3:
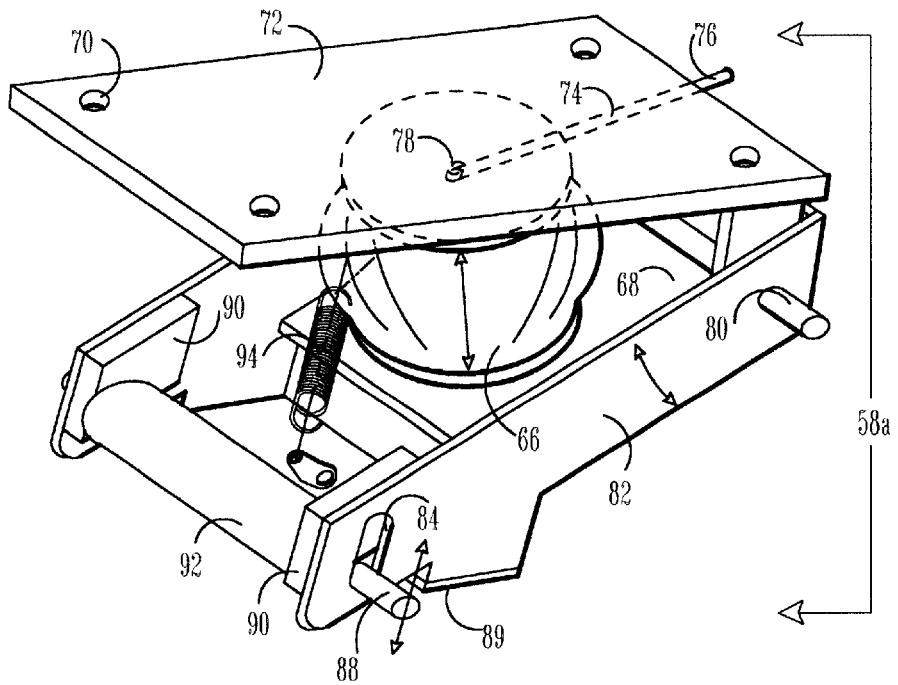
FIG. 3 is a perspective view of an alternative air bag actuated embodiment of guide wheel integrated with ground rubbing brake.

The view of FIG. 3 shows an alternative embodiment of 'guide wheel integrated with ground rubbing brake' referred to as assembly 58a. As shown, a flat upper plate 72 attaches pivotally to a subassembly that includes arms 82. Assembly 58a forms a hinged clamshell type arrangement. A shaft serves as a pivot 80. Upper plate 72 includes mounting holes 70 for bolt attachment to load base 54 of FIG. 1. Positioned between upper plate 72 subassembly and arm 82 subassembly is an air bag 66. When air bag 66 pressurizes, it forces plate 72 to separate radially from arm 82 subassembly about pivot 80. A spring 94 connects between arm 82 subassembly and plate 72 to close the clamshell whenever pressure vacates air bag 66. In this manner, guide wheel 92 will not touch the floor until air bag 66 pressurizes.

Plate 72 includes a radial fluid passage 74 within its thickness extending from one edge to the center point of air bag 66. At this center point, a corresponding aperture 78 conveys one end of passage 74 to a bag 66 interior. The outer end of passage 74 has attached without leakage a tube 76. A gasket, not shown, sandwiches between air bag 66 and plate 72. As shown in the view of FIG. 1, pressurized fluid from valves 64 or 52 convey to tube 36. Fluid then flows, as shown in FIG. 3, through passage 74, through aperture 78, and into air bag 66. Pressurized air bag 66 forces arm 82 subassembly down away from plate 72, and toward the floor. Arms 82 include slots 84 near one end to slideable accept a shaft 88. Thus shaft 88 is able to move in the direction of the arrow shown in the view of FIG. 3. Shaft 88 is the axle for a guide wheel 92. Wheel 92 is free to revolve on shaft 88. Wheel 92 includes a center bore with appropriate annular clearance for rotation. Under shaft 88, and adjacent to arms 82 nest preloaded compressive springs 90. Springs 90 are flexible rubber pad type. Springs 90 keep a nearly constant force applied to shaft 88, and forces shaft 88 to the limit of slot 84 travel. Spring 90 force magnitude is that necessary to supply traction of wheel 92 with the floor. A brake pad 89 fastens to arm 82 subassembly in such a position that brake 89 is above the floor, about a minimum of 0.1 inch, when guide wheel 92 touches the floor. With this arrangement, wheel 92 can guide load base 54 while brake 89 is off the floor. However, if arm 82 subassembly forces further radially, by air bag 66, wheel 92 retracts within its slots 84, and brake 89 forces against the floor, stopping load base 54. Brake 89 is made from medium to hard polyurethane so as to have appropriate friction properties and durability. Brake 89 attaches to arm 82 subassembly using adhesives or bolts.

6. Alternate Embodiment—Including Power Steering

Figure 4:
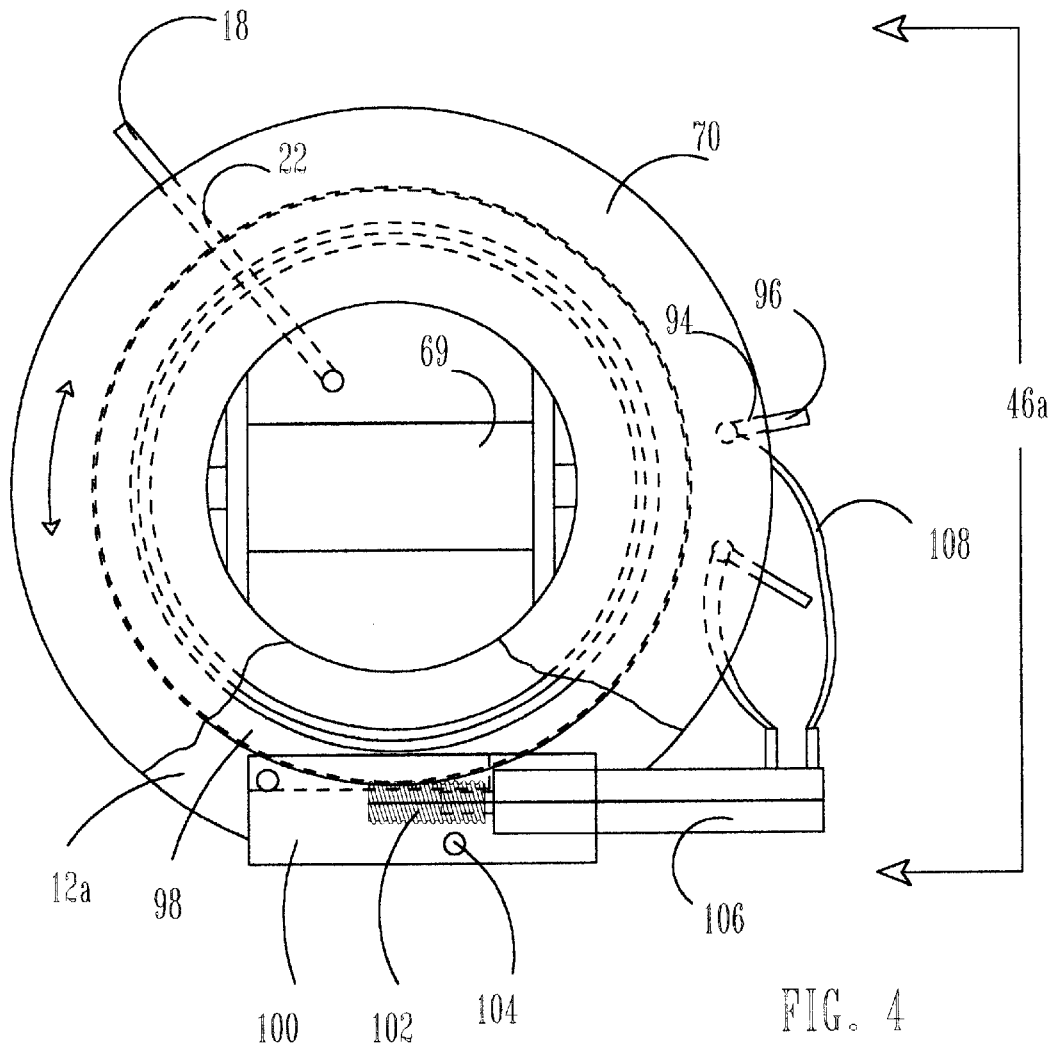
FIG. 4 is a bottom plan view with a partial broken away section of a similar guide wheel integrated with ground rubbing brake assembly of FIG. 2 including a power motor castering steering feature.
Figure 5:
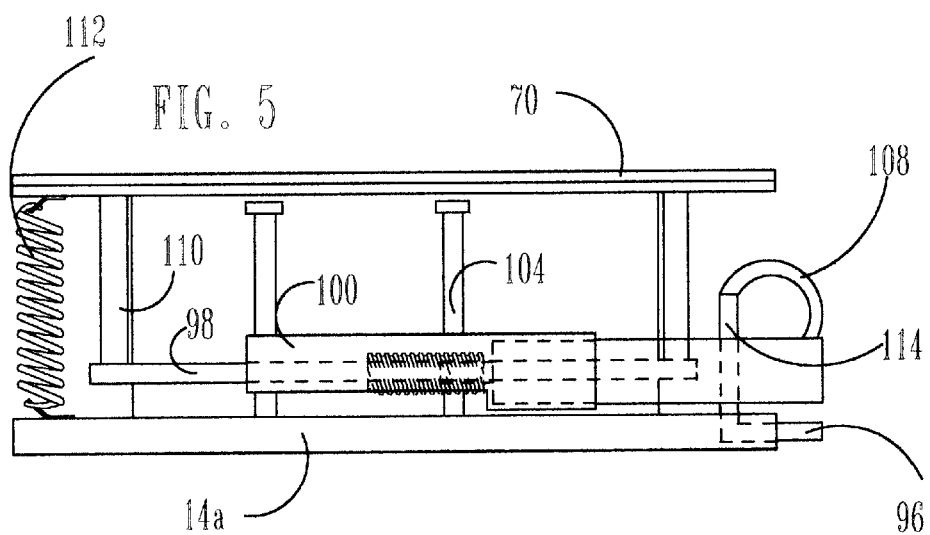
FIG. 5 is a plan elevation view of the assembly of FIG. 4.

A bottom planar view of an alternative powered embodiment of my invention, referred to as assembly 46a, is shown in FIG. 4 view. This embodiment adds to invention 58 of FIGS. 1 and 2, a gear motor 106 power feature that can rotate a center subassembly that includes guide wheel 69 and brake 70. Gear motor 106 is a reversible miniature air motor and gearbox type as described in the industrial catalog McMaster Carr of Los Angeles. A mounting plate 14a is similar to flange 14 described in FIG. 2 above with two more radial fluid passages 94 added. Passages 94 are similar to previously described passage 22. The length of both of these passages 94 are chosen so as to end in perpendicular attached leakproof tubes 114 shown best in side plan view of assembly 46a of FIG. 5. The opposite ends of passages 94 have fixed two more tubes 96. Two flexible air hoses 108 complete the plumbing of tubes 96 to gear motor 106. Pressurized fluid entering one of tubes 96 will drive gear motor 106 in one direction. Fluid entering other tube 96 will reverse gear motor 106 rotation. The view of FIG. 4 shows brake 70 surface partially broken away near gear motor 106 to reveal a large annular shaped worm ring gear 98. Ring gear 98 rigidly attaches to the bottom of brake 70 via a bolt attached cylinder. Ring gear 98 moves vertically with brake 70 stroke during movement of assembly 46a. Ring gear 98 is made from a brass component selected from commercial Boston Gear catalog. Ring gear 98 has its center bore enlarged to match assembly 46a outside diameter. A gear motor mounting block 100 positions gear motor 106 in a positive radial and central position with respect to ring gear 98. Shaft of gear motor 106 has attached a mating worm gear 102. Worm gear 102 is made from a steel material component also selected from the Boston Gear catalog. As gear motor 106 shaft rotates, ring gear 98 also rotates with respect to mounting plate 14a. Since ring gear 98 moves vertically with assembly 46a stroke, mounting block 100 attaches slidably, in the vertical direction, to plate 14a via long pins 104. The ends of pins 104 near brake 70 include heads that limit brake 70, ring gear 98, and mounting block 100 travel. Pins 104 are made from ground steel and are attached to plate 14a with threads or roll pins, not shown in the view. Block 100 includes a slot a few one thousands of an inch thicker than ring gear 98. Ring gear 98 slides in the slot during rotation. When ring gear 98 moves vertically, mounting block 100 and attached gear motor 106 move with it. The mounting block 100, ring gear 98, and gear motor 106 all return to their inactivated position via brake retraction spring 112. Block 100 is made from delrin material so as to resist friction, wear, and include strength characteristics necessary while contacting pins 104 and ring gear 98.

When a human operator desires to alter load base 54 direction, they apply pressurized fluid to one of tubes 96. Simple valves, not shown, but similar to the valves of the fluid controls previously described, work well for this purpose. This action causes gear motor 106 to rotate ring gear 98. Ring gear 98 rotation causes rotation of central subassembly. Since guide wheel 69 is part of the subassembly, it rotates also. With this embodiment, an invention 46a can power steer in infinite directions. Once operator sets desired guide wheel 69 direction, worm gear 102 automatically locks in that position. Worm gear 102 inherent mating characteristics with ring gear 98 refuses to allow unpowered rotation.

Gear motor 106 would not necessarily have to be fluid powered, and another embodiment could substitute an electric motor for example.

7. Alternate Embodiments—Additional

The particular invention shown in the view of FIG. 2 is not the only structure or shape that can include the motor powered rotation feature. For example, the air bag actuated embodiment of FIG. 3 can be easily adapted for steering with similar worm gears and gear motor drive. For purposes of exemplification, particular embodiments of the invention have been shown and described to the best understanding thereof. However, other embodiments can include other guide wheel integrated with ground rubbing brake assemblies, irrespective of their particular structure, materials, fluidic plumbing, without departing from the spirit and scope of the claimed invention.

The embodiments and descriptions above have been by way of illustration, rather than limitation. The scope and content of this invention being determined by the following claims.

I claim:

1. A device for attachment to fluid levitated object for stopping and guiding movement along a ground surface thereunder, comprising:
    (a) a supporting frame,
    (b) a brake,
    (c) a brake attachment frame mounting said brake on said supporting frame and in cooperation with said ground surface so as to afford readily stoppable movement characteristics to the device,
    (d) a brake variable-yieldable bias means between said brake attachment frame and said supporting frame, producing variable force therebetween to yieldably urge said brake into anti-slip rubbing engagement with said ground surface, (e) a guide wheel, (f) a guide wheel attachment means mounting said guide wheel on said brake attachment frame for rotation about a horizontal axis and cooperation with the aforesaid ground surface so as to afford readily guidable non-side-slip movement characteristics to the device, (g) a compressive separating means between said brake attachment frame and said guide wheel attachment means, so when said brake variable-yieldable bias means force is low, said guide wheel only contacts said ground surface; and as said brake variable-yieldable bias means force is high, said brake also contacts said ground surface.

2. The device for attachment to fluid levitated object of claim 1, wherein said brake variable-yieldable bias means is in the form of an expandable fluid bag availed of fluid at super atmospheric pressure.

3. The device for attachment to fluid levitated object of claim 1, wherein said brake variable-yieldable bias means is in the form of a piston-cylinder availed of fluid at super atmospheric pressure.

4. The device for attachment to fluid levitated object of claim 1, wherein said guide wheel attachment means is motorized rotatable with respect to said supporting frame so as to add remote steering feature to said guide wheel.

* * * * *